United States Patent [19]

Reifer

[11] Patent Number: 5,742,379
[45] Date of Patent: Apr. 21, 1998

[54] DEVICE AND METHOD FOR ELECTRONICALLY MEASURING DISTANCES

[76] Inventor: Michael H. Reifer, 9605 Clocktower La., Columbia, Md. 21046

[21] Appl. No.: 563,966

[22] Filed: Nov. 29, 1995

[51] Int. Cl.[6] ................................................ G01C 3/08
[52] U.S. Cl. ........................................ 356/5.07; 356/5.13
[58] Field of Search .......................... 356/5.06, 5.07, 356/5.08, 5.12, 5.13

[56] References Cited

U.S. PATENT DOCUMENTS

| | | | |
|---|---|---|---|
| 4,274,736 | 6/1981 | Balmer | 356/5.13 |
| 4,297,030 | 10/1981 | Chaborski | 356/5.13 |
| 4,403,857 | 9/1983 | Holscher | 356/5.13 |
| 4,620,788 | 11/1986 | Giger | 356/5.13 |
| 4,768,877 | 9/1988 | Torregosa et al. | 342/127 |
| 4,942,561 | 7/1990 | Ohishi et al. | 356/5.13 |
| 5,002,388 | 3/1991 | Ohishi et al. | 356/5.13 |
| 5,241,360 | 8/1993 | Key et al. | 356/5.12 |

Primary Examiner—Stephen C. Buczinski
Attorney, Agent, or Firm—Abanti B. Singla; Gora L. Singla

[57] ABSTRACT

A device and method of electronically obtaining range or distances from the device to the target utilizing a central processing unit (CPU) in combination with a pulse repetition frequency generator, a plurality of photodetectors and a transistor to transistor clock counter, in a lightweight and portable configuration. The device obtains a plurality of samples, which enables the CPU to determine filter delay, range resolution and count deviations so as to accurately determine range or distance measurement to within plus or minus one centimeter.

14 Claims, 2 Drawing Sheets

DEVICE AND METHOD FOR ELECTRONICALLY MEASURING DISTANCES

BACKGROUND OF THE INVENTION

The present invention is directed to a method and device for measuring distances, electronically. The field of target detection was first developed in the radio frequency portion of the electromagnetic spectrum and is commonly known as RADAR (radio detection and ranging). Later developments of controllable light sources such as lasers allowed RADAR concepts to be applied in the light portion of the electromagnetic spectrum for fight detection and ranging, or LIDAR.

Currently, several methods are utilized to determine distances using electromagnetic energy, including interferometry, pulse time of flight (hereinafter abbreviated TOF), and code correlation techniques. One of the simpler code correlation techniques is phase detection of a modulated signal. In this technique, the carrier is modulated at a frequency unrelated to the frequency of the carrier. Phase detection of the carrier is one form of interoferometry.

TOF and code correlation are based on measuring the time duration between two events, such as when the signal leaves the range finder and when the return signal is received by the range finder. The time duration between these two events is directly proportional to the distance and can be converted and displayed in a number of ways as representation of the distance. Obviously, the precision of the distance measurement is directly related to the precision of the time measurement.

Various techniques have been developed to overcome the limitations of the available electronic circuitry in pursuit of greater precision. One of these techniques involves mixing a detected signal with some known reference signal and obtaining an intermediate frequency (hereinafter abbreviated, IF). The IF approach has the advantage of being at a lower frequency than the originally detected signal, but still possesses the same relative phase information. The phase information could subsequently be handled by circuitry capable of retrieving the phase information from the lower frequency IF signal.

Another technique for improving precision is to apply phase detection concepts on clock signals used for measuring time durations between the transmitted and received signals. This technique allows fractions of a clock period to be determined without exceeding the capabilities of available clock speeds.

In yet another technique known as the null technique, the phase relation between the transmitted signal and the received signal is determined by adjusting the phase of a reference signal and adding it to the received signal. The reference signal is designed such that when it is in phase with the received signal the resultant value is zero. In this technique, the quantity of adjustment needed is representative of the distance being measured.

An important factor in detecting light signals lies in the detector discerning a change in the relative intensity of light as it is being illuminated by the transmitted fight. In order to detect such a change in light intensity many systems use an Avalanche Photodiode (hereinafter abbreviated an APD). APDs offer a variety of advantages including large detection bandwidths.

Large detection bandwidths allow pulse frequency spectrum (hereinafter abbreviated PFS) lines beyond the fundamental pulse repetition frequency (hereinafter abbreviated PRF) of the pulse train to be preserved. Some techniques for increased precision of range resolution phase detect these higher PFS lines. This is advantageous after phase detection of the fundamental PRF has resolved any range ambiguities.

Many existing systems switch between a number of PRFs when the fundamental PRF frequency is so high as to not provide unambiguous resolution of the range. The specific PRFs used are in general chosen for their mathematical ability to unambiguously resolve the range.

In addition to precision, greater accuracy is also of concern. When an electronic signal is passed through a frequency filter, some quantity of phase delay (possibly as a function of the frequency) will be added to the signal. The quantity of phase delay and phase delay as a function of frequency will be dependent on the filter used. Regardless of the filter used, and in order to accurately measure distances, the phase delay of the filter must be accounted for somewhere in the signal processing.

A known device and method utilizes a plurality of identical filters and simultaneously passes the received and reference signals through their respective filters prior to phase comparison. This device and method requires extensive circuitry and is cost ineffective.

Another method, known as the serial method, passes the reference and received signals through one filter but at different times. This method compares the reference signal against itself, before and after it passes through the filter, to determine the phase delay (hereinafter abbreviated TPD) induced on the signal by the filter. At another time the "before-the-filter" reference signal is measured against the "after-the-filter" received signal. The phase difference representing the range is obtained by first obtaining a difference between the "after-the-filter" and "before-the-signal" signals, and thereafter removing the TPD from the result. The serial method utilizes mirrors, fiber optics etc. for the purpose of switching the input to the detector between the reference signal and the received signal.

All of the methods cited above overcome the limitations of the electronics available at the time of their inventions. However, due to recent advancements in electronic components, a new phase detection and measurement system is needed to overcome the limitations of the current and existing systems.

One recent advancement is the increased speed at which available components now perform. For example, it is now possible to build simple transistor to transistor (hereinafter abbreviated TTL) clock counters directly running at or above 150 MHZ. The speed of light, c, is nominally 299.93 million meters per second. A clock capable of counting at 299.93 MHz provides one clock cycle for each meter of distance traveled by light. Since in RADAR/LIDAR technology, electromagnetic energy to travel the distance twice (from the range finder to the target and back), the clock need only count at roughly 149.965 MHz for each clock cycle to represent one meter of distance traveled from the range finder to the target. This improvement provides an ease with which such a clock can be interfaced to all other existing TTL devices.

Another advancement is the ability of electronic components to sense or handle current signals on the level of pico-amps. This allows use of photodiodes and/or phototransistors to detect signals too small to process with existing devices, which are unable to detect and utilize signals of such small magnitude, such that photodiodes and/or phototransistors can now be utilized is circumstances previously limited to APD use. The advantages of photodiodes and/or phototransistors over APDs include the ability to operate at TTL voltage levels and their not being as temperature sensitive as APDs, thereby reducing the comparative circuitry and complexity associated with detecting light via APDs. Photodiodes and phototransistors also cost significantly less than APDs.

U.S. Pat. No. 5,241,360 to Key et al disclose a device for measuring distances utilizing a laser having external and reference light beams to measure reflected light from an object to a source utilizing an APD light detector with a mirror to reflect light, either external or internal. The mirror is driven by a motor which is controlled by a microprocessor. In an alternate embodiment, a beam splitter may also be utilized. The device also comprises a bandpass filter to reduce background noises. The Key et al. reference utilizes existing APD circuitry, does not provide for utilizing a 150 MHz clock and, therefore, does not provide for utilizing the 149.965 MHz clock as the present invention does.

U.S. Pat. No. 4,768,877 to Torregrosa et al. disclose a method and device for measuring distances wherein the method includes a step for controlling the phase shift so that the average value of the detected signal is zero. The device as taught by Torregrosa et al. comprises a first generator having a clock input, reset input and an OR gate. The method and device as taught by Torregrosa et al. does not provide the precision, accuracy or clock speed provided for in the present invention.

SUMMARY

Accordingly, it is an objective of the present invention to provide a device and method of electronically measuring distances that is capable of precisely and accurately measuring distances to one thousand meters with a resolution on the order of plus or minus one centimeter.

It is another objective of the present invention to provide a phase detection distance finder having an improved circuitry and design.

It is yet another objective of the present invention to provide a phase detection distance finder that is lightweight, battery operated and portable.

These and other objectives are realized by providing an electronic distance or range finder that is capable of utilizing current improvements in electronic components, including increased precision, increased clock speed and accuracy.

DRAWINGS

DETAILED DESCRIPTION OF THE PREFERRED EMBODIMENTS

Figure 1:
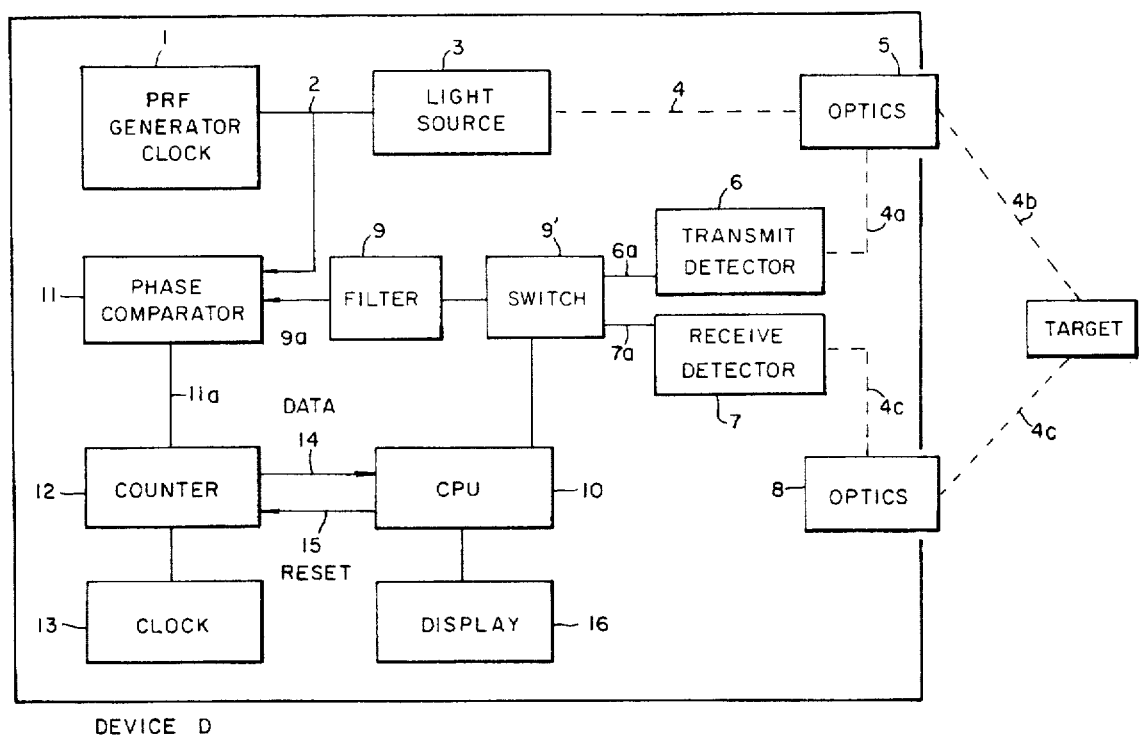
FIG. 1 is a flow diagram of the present invention.

As shown in FIG. 1, the device D of the present invention includes a pulse repetition frequency (PRF) generator clock 1 which operates at a PRF of 150 KHZ, thereby allowing the rangefinder device D to operate for an unambiguous range of one thousand meters. A signal 2 from generator 1 is supplied to a light source 3, to generate a light output 4. The light source 3 may be a pulsed laser diode or a continuous wave (or CW) laser diode. When the light source 3 is a pulsed laser diode, it triggers on the leading edge of signal 2, to create the light output 4. When the light source 3 is a CW laser diode, the signal 2 is used to modulate the light output 4 from the CW laser diode.

Rangefinder device D further includes a first optics 5 which is necessary for collimating, focusing and filtering light output 4 from either the pulsed laser diode or the CW laser diode. The light output 4 is disseminated, whereupon a light output portion 4a of disseminated light output 4 is detected by a transmitting photodetector or light detector 6. The transmitting photodetector 6 is positioned between light source 3 and optics 5. In another embodiment, transmitting photodetector 6 may be combined with optics 5. In yet another embodiment, transmitting photodetector 6 may be positioned between optics 5 and signal filter 9, which shall be discussed, hereinbelow.

Another light output portion, or light signal 4b of disseminated light output 4, is transmitted to a target, the distance between which and the rangefinder device D is being measured. A receiving photodetector or light detector 7 is utilized for detecting a part of the light output portion or light signal, 4c, returning from the target. A second optics 8, are utilized to collect, focus and filter the detected part 4c, onto detector 7.

Where light source 3 is used to generate a light output 4 from an electrical signal 2, transmitting photodetector 6 generates an electrical signal 6a and receiving photodetector 7 generates an electrical signal 7a from light output portions 4a and 4c, respectively. Photodetectors 6 and 7 are phototransistors, photodiodes or avalanche photodiodes.

The signal filter 9 is connected to a switch 9', where the filter 9 and switch 9' are used to process the signals 6a and 7a. The choice of which signal passes through filter 9 at what time and sequence is determined via the switch 9' by a central processing unit (hereinafter abbreviated CPU) 10, which is a microprocessor. The filter 9 is a narrow bandpass filter with the pass band of filter 9 being centered on the frequency generated by the PRF generator clock 1. The filtered signal passes out of filter 9 as a signal 9a (corresponding to either signal 6a or 7a), which then enters a phase comparator 11. Phase comparator 11 generates a signal 11a, the starting point of which is at the leading edge of signal 2 from generator clock 1 and the stopping point of which is at the transition point from one side to the other of the zero crossing point of signal 9a. The starting point and stopping point of the signal 11a is used by a counter 12 to begin and end a count of the number of cycles lapsed on a 149.965 MHz distance clock 13, wherein one distance clock 13 cycle is equivalent to one meter of radar distance. Because the speed of light travels at a constant rate, the number of clock 13 cycles may be used as a representation of distance traveled. By using a 149.965 MHz clock 13, where each clock 13 cycle represents one meter of radar distance, the CPU 10 can easily compute the distance traveled. After the stopping point of signal 11a, a count 14, representing the measured distance clock 13 cycle count from counter 12, is passed to the CPU 10. The CPU 10 then resets counter 12 utilizing a reset signal 15. Pursuant to passing the reset signal 15, the rangefinder device D is ready to begin the next cycle count of another signal 11a, using the counter 12 and the clock 13.

The method of operating the device is as follows. The method utilized by rangefinder device D is a serial processing method, wherein a plurality of measurements are utilized to accurately determine a distance range. One measurement calibrates the delay introduced by filter 9. Another measurement provides a quantity which is the sum of the path delay to the target and the filter delay. The path delay to the target is found by obtaining the difference between the first and second measurements. Since the rangefinder device D converts time to distance, this path delay is displayed as the range to the target.

Figure 2:
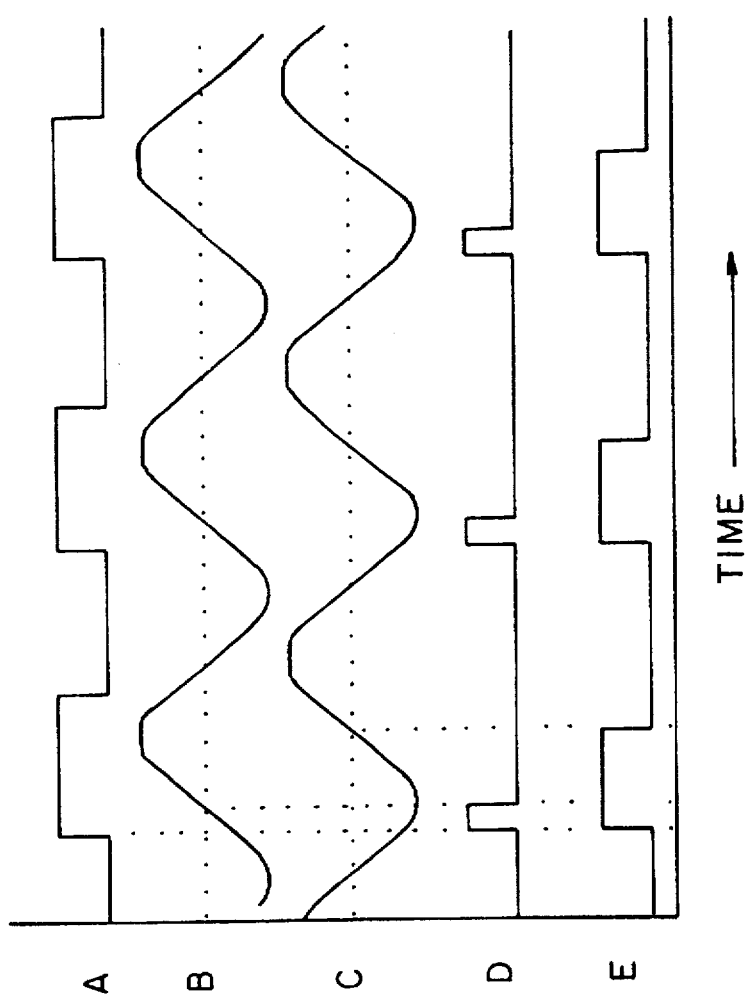
FIG. 2 is a diagram showing the relative timing of signals within the flow diagram of FIG. 1.

The CPU 10 begins the process of obtaining a range measurement by selecting either signal 6a or signal 7a as the input into filter 9. In this case of signal 6a, the only delay between the starting point of signal 2 and the change over to the other side of the zero crossing point of signal 9a is caused by filter 9. Therefore, signal 6a from light detector 6 to filter 9, is used to calibrate the delay caused by filter 9. This delay, shall hereinafter be referred to as $T_1$. Line A of FIG. 2 shows the signal 2 from generator 1. Line B shows the relative timing between signal 2 from the generator clock 1 and signal 9a, when signal 6a is the input to filter 9. Line C shows the relative timing between signal 2, from the generator clock 1 and signal 9a, when signal 7a is the input to filter 9. Line D shows gate pulses of signal 11a representing $T_1$.

Pursuant to the $T_1$ measurement, the CPU 10 records a plurality of count 14 readings obtained from distance clock 13. CPU 10 then averages the plurality of count readings and records it. The averaging technique is a software method for reducing noise introduced to signal 11a by other parts of the rangefinder device D. The averaging technique also provides for increased range resolution. The distance clock 13 provides timing counts which equate to a range resolution of plus or minus one meter. In the ideal situation of no noise, the number of $T_1$ measurement sample N or $T_2$ (which shall be discussed, hereinbelow) measurement samples N, could be averaged to provide (one meter)/N resolution. While there is a limit to the resolution attainable through this precision improving technique, the rangefinder device D, using this technique, is able to obtain a one centimeter resolution for N equal to 100 or more measurement samples.

To further enhance the statistical precision of this technique, the PRF generator clock 1 and the distance clock 13 operate independently of one another, allowing one to dither with respect to the other. Furthermore, since the averaging technique is also utilized to remove noise, a number of measurement samples M, where M is greater than N, are averaged.

In addition to performing the averaging technique, CPU 10 also tracks a measurement representing the deviation of individual count 14 readings from the averaged count 14 clock reading. The purpose for this deviation from average (hereinafter abbreviated DFA) is discussed hereinbelow.

Since $T_1$ almost always has some non-zero value, the entire cycle of signal 11a measurements cannot be used to determine the unambiguous range. That is, the unambiguous range of one thousand meters is reduced by the amount of $T_1$, where the quantity of $T_1$ is dependent upon the design of filter 9. The CPU 10 records an M number of count 14 samples, for determining $T_1$.

When the CPU 10 selects the signal 7a as input to filter 9, the method used for determining $T_1$ is repeated, for another M number of count 14 samples. However, since signal 7a is the signal obtained from the receiving light detector 7, each individual count 14 sample is the sum, hereinafter referred to as $T_2$, of the filter 9 delay and the path delay to the target. FIG. 2, line E shows the effects of this value on signal 11a.

The CPU 10 now determines the range or distance between the rangefinder device D and the target, by either averaging the difference between $T_1$ and $T_2$ or alternatively by differencing the average between $T_1$ and $T_2$. The value of the range or distance is then displayed on display 16. Device D can thereafter repeat the entire process until it is turned off.

To operate the rangefinder device D, the user turns the device D on which in turn starts the CPU 10. By pointing the rangefinder device D towards the target, a plurality of $T_1$ and $T_2$ measurements are obtained and utilized to obtain the range by the method described hereinabove. The resultant range or distance is then displayed upon display 16. The rangefinder device D may be used in a variety of situations wherein either or both the rangefinder device D and the target are stationary or moving.

While the rangefinder device D will determine the range or distance under normal operating conditions, the value for the range may not always accurately represent the range to the target. That is, detector 7 may not always detect the light signal 4c, from the target. The DFA value is computed for these particular instances. When detector 7 is able to detect the return signal 4c from the target, the computed DFA value will be small. However, as the ratio of the light signal 4c to noise decreases, the DFA value will increase, whereupon the DFA crosses a threshold value indicating insufficient part of light signal 4c incident upon detector 7. The CPU 10, will then alert the user that the DFA threshold value has been crossed. The CPU 10 may indicate this condition in a number of ways, including displaying a fluctuating light (ie; on to off, or off to on) on display 16, or cause a specific value to appear on display 16 (ie; all zeros).

What is claimed is:

1. A rangefinder device for electronically measuring range comprising:

a generator clock constructed so as to supply a first signal having a leading edge, to a light source;

said light source constructed so as to receive said first signal and generate a disseminated light output from said first signal;

a transmitting photodetector constructed so as to detect a first portion of said light output, said transmitting photodetector is further positioned such that said transmitting photodetector detects said first portion of said light output from a first optics, said first optics constructed so as to collimate, focus and filter said light output; wherein said transmitting photodetector is further constructed so as to generate a first electrical signal from said first portion of said light output;

said light output comprising a second portion, wherein said second portion is transmitted to a target, wherein a distance between said rangefinder device and said target defines said range;

a receiving photodetector constructed so as to detect a part of said second portion of said light output returning from said target, said receiving photodetector further comprising a second optics constructed so as to collect, focus and filter said second portion of said light output on said receiving photodetector, wherein said receiving photodetector is further constructed so as to generate a second electrical signal from said returning part of said light output;

a signal filter connected to a switch, said filter and switch constructed so as to process said first and second electrical signals from said transmitting photodetector and said receiving photodetector signals;

a central processing unit constructed so as to determine which of said first and second electrical signal is passed through said filter at what time and sequence, said signal filter further constructed so as to generate a filtered signal from each of said first and second electrical signals, wherein said filtered signal having a zero crossing point;

a phase comparator constructed so as to receive said each of said filtered signal, said phase comparator is further constructed so as to generate a comparator signal, wherein said comparator signal comprises a starting point as said leading edge of said first signal and a stopping point at a transition point from one side of said zero crossing point to another side of said zero crossing point of said filter signal;

a distance clock having a counter, said clock and counter constructed so as to count lapsed cycles during said comparator signal, wherein said clock and counter are further constructed so as to count said lapsed cycles for a plurality of samples, wherein said counter begins counting at said starting point and stops counting at said stopping point, said central processing unit is further constructed so as to reset said counter and wherein said clock and counter are further constructed such that said counted lapsed cycles are used as a representation of said range;

wherein said central processing unit is further constructed so as to average said count lapsed cycles from said plurality of samples, determine a filter delay measurement, determine a deviation based upon said averaged count lapsed cycles, determine a path delay measurement, determine a sum of said filter delay and said path delay, determine said distance measurement from said count lapsed cycles, said filter delay measurement and said path delay measurement, said computer processing unit is further constructed so as to display said distance measurement on a display unit, and said computer processing unit is further constructed so as to alert a user, through said display unit, when a threshold value of said deviation has been crossed, said threshold value being indicative of insufficient part of said second portion of said light output incident upon said receiving photodetector.

2. A device as recited in claim 1, wherein said generator clock comprises a pulse repetition frequency generator, wherein said generator clock is constructed so as to operate said rangefinder device at a pulse repetition frequency of 150 KHz, said rangefinder device is further constructed so as to operate at distances of at least one thousand meters, wherein said distance clock comprises a 149.965 MHz clock, and wherein said generator clock and said distance clock are constructed so as to operate independently of each other.

3. A device as recited in claim 2, wherein said light source is selected from the group consisting of pulsed laser diodes and continuous wave laser diodes.

4. A device as recited in claim 3, wherein said first and second photodetectors are selected from the group consisting of photodetectors, photodiodes and avalanche photodiodes.

5. A device as recited in claim 4, wherein said filter is a narrow bandpass filter.

6. A method for electronically measuring range comprising the steps of:

(a) turning on a central processing unit of a rangefinder device;

(b) generating a first signal from a generator and passing said first signal to a light source;

(c) generating a light output from said light source, collimating, focusing and filtering said light output from said light source using a first optics;

(d) detecting a first portion of said light output by a transmitting photodetector and generating a first electrical signal;

(e) transmitting a second portion of said light output to a target and receiving a part of said second portion of said light output from said target;

(f) collecting, focusing and filtering, using a second optics, said part of said second portion of said light output onto a receiving photodetector, and generating a second electrical signal by said receiving photodetector;

(g) determining which of said first and second electrical signal to pass through a switch .and a signal filter at what time and sequence, using said central processing unit;

(h) passing one of said first and second electrical signal through said signal filter and generating a filtered signal using said signal filter;

(i) receiving said filtered signal from step (h) in a phase comparator, and generating a comparator signal having a starting point at a leading edge of said first signal and a stopping point at a transition point from one side of a zero crossing point to another of said zero crossing point, of said filtered signal;

(j) counting a lapsed distance clock cycles for said comparator signal using a counter, and beginning the counting of said lapsed cycles at said starting point and stopping the counting of said lapsed cycle at said stopping point;

(k) passing a count representing said lapsed cycles from said counter to said central processing unit and recording said count in said central processing unit;

(l) resetting said counter by passing a reset signal between said central processing unit and said counter;

(m) repeating said steps (i), (j), (k), (l), for a plurality of samples;

(n) passing other of said first and second electrical signals through said signal filter and generating a filtered signal using said signal filter;

(o) receiving said filtered signal of step (n) in said phase comparator, and generating a comparator signal having a starting point at a leading edge of said first signal and a stopping point at a transition point from one side of a zero crossing point to another of said zero crossing point;

(p) counting lapsed distance clock cycles for said comparator signal of step (o), using said counter, and beginning counting of said lapsed cycles at said starting point and stopping counting of said lapsed cycles at said stopping point;

(q) passing a count representing said lapsed cycles of step (p) from said counter to said central processing unit and recording said count in said central processing unit;

(r) resetting said counter by passing a reset signal between said central processing unit and said counter;

(s) repeating said steps (o), (p), (q) and (r) for a plurality of samples;

(t) averaging said lapsed cycles count of step (k), averaging said lapsed cycles count of step (q), determining a filter delay based on said one of said lapsed cycles, determining a sum of said filter delay and a path delay based on other of said lapsed cycles and determining a deviation based on said other of said averaged lapsed cycles, in said central processing unit and recording a measurement for said averaged lapsed cycles of step (k), a measurement for said averaged lapsed cycles of step (q), a measurement for said filter delay, a measurement for said deviation, said measurement for sum of said filter delay and said path delay;

(u) determining in said central processing unit, said range between said rangefinder device and a target from step (t) above; and (v) displaying said range on a display.

7. A method for electronically measuring range as recited in claim 6, and further comprising the step of using said filter delay and calibrating said central processing unit, wherein said filter delay is introduced by said signal filter.

8. A method for electronically measuring range as recited in claim 7, and further comprising the step of comparing said deviation to a threshold deviation value, said threshold deviation value indicating insufficient part of said second portion of said light output incident upon said receiving photodetector and alerting a user using said display that said threshold deviation value has been crossed.

9. A method for electronically measuring range as recited in claim 8, and further comprising the step of displaying a means on said display when said threshold deviation value has been crossed.

10. A method for electronically measuring range as recited in claim 9, and further comprising the step of using said means selected from the group consisting of a fluctuating light and a specific numeric value.

11. A method for electronically measuring range as recited in claim 10, and further comprising the step of operating said generator clock at 150 KHZ and operating said distance clock at 149.965 MHZ.

12. A method for electronically measuring range as recited in claim 11, and further comprising the step of operating said generator clock and said distance clock independently of each other.

13. A method for electronically measuring range as recited in claim 12, and further comprising the step of averaging a difference between said measurement for said filter delay and said measurement for sum of said filter delay and said path delay and determining said range.

14. A method for electronically measuring the range as recited in claim 12, and further comprising the step of differencing an average between said measurement for said filter delay and said measurement for sum of said filter delay and said path delay and determining said range.

* * * * *